United States Patent
Chen et al.

(10) Patent No.: US 12,061,563 B2
(45) Date of Patent: Aug. 13, 2024

(54) EVENT RECORDER AND METHOD THEREOF

(71) Applicant: LITE-ON TECHNOLOGY CORPORATION, Taipei (TW)

(72) Inventors: Kuang-Hung Chen, Taipei (TW); Shun-Hung Lo, Taipei (TW); Nien-Yi Chung, Taipei (TW); Yu-Shun Liu, Taipei (TW)

(73) Assignee: LITE-ON TECHNOLOGY CORPORATION, Taipei (TW)

( * ) Notice: Subject to any disclaimer, the term of this patent is extended or adjusted under 35 U.S.C. 154(b) by 187 days.

(21) Appl. No.: 17/578,258

(22) Filed: Jan. 18, 2022

(65) Prior Publication Data
US 2023/0013407 A1    Jan. 19, 2023

(30) Foreign Application Priority Data
Jul. 13, 2021 (CN) .......................... 202110789098.3

(51) Int. Cl.
*G06F 13/40* (2006.01)
*G06F 1/3206* (2019.01)
*G06F 9/54* (2006.01)

(52) U.S. Cl.
CPC ........ *G06F 13/4059* (2013.01); *G06F 1/3206* (2013.01); *G06F 9/542* (2013.01); *G06F 13/4072* (2013.01)

(58) Field of Classification Search
CPC .................................................. G05B 23/0283
See application file for complete search history.

(56) References Cited

U.S. PATENT DOCUMENTS

| 10,552,728 B2* | 2/2020 | Oliner ................ G06Q 10/0637 |
| 2022/0285022 A1* | 9/2022 | Ellis ....................... H04L 67/125 |

FOREIGN PATENT DOCUMENTS

| CN | 101155172 B |   | 1/2013 |
| CN | 203260077 U | * | 10/2013 |

OTHER PUBLICATIONS

Taiwan Office Action corresponding to Application No. 110125612 and issued on Jul. 25, 2022, 6 pages.

* cited by examiner

*Primary Examiner* — Henry Tsai
*Assistant Examiner* — Juanito C Borromeo
(74) *Attorney, Agent, or Firm* — Innovation Counsel LLP (57) ABSTRACT

An event recorder for a power supply and a method thereof are provided. The event recorder method includes: selecting an event combination; based on the selected event combination, performing a setting step to set a trigger source combination and a record data combination, wherein the setting step further comprises any combination of the following: setting a record data type combination, setting a trigger type combination, setting a resolution combination, and setting a logic combination; and in response to a logic combination result of the trigger source combination, storing the record data combination in a storage unit.

13 Claims, 9 Drawing Sheets

EVENT RECORDER AND METHOD THEREOF

This application claims the benefit of People's Republic of China application Serial No. 202110789098.3, filed Jul. 13, 2021, the subject matter of which is incorporated herein by reference.

BACKGROUND OF THE INVENTION

Field of the Invention

The invention relates in general to an event recorder and a method thereof.

Description of the Related Art

Currently, power supply is equipped with a black box. When the power supply breaks down accidentally, the cause of failure can be understood by examining data recorded in the black box.

A more advanced black box of power supply can record the events for a period of time after the breakdown. However, the problem of data synchronization between different chips is still left unresolved.

Besides, the current trigger event is fixed, and the trigger event can be subjected to the breakdown or input problem of the device. Actually, even when the power supply is in a normal state, system quality may still be affected by many problems (such as current share instability).

Additionally, the current power supply cannot adjust or set the trigger source. By adjusting or setting the trigger source, the system can be better used in different applications.

Furthermore, the current power supply cannot adjust or set the record data nor adjust/or set data resolution or time resolution. The adjustment or setting of data resolution or time resolution is very important for one to understand different failure conditions.

SUMMARY OF THE INVENTION

The invention is directed to an event recorder and a method thereof capable of setting the trigger source and the record data according to the selected event to benefit the analysis and understanding of the trigger event.

According to one embodiment of the present invention, an event recorder is provided. The event recorder includes: an adaptive event selection unit, a setting unit, and an event record unit. The adaptive event selection unit is configured to select an event combination. The setting unit is configured to perform a setting step based on the selected event combination, wherein the setting unit sets a trigger source combination and a record data combination, and the setting unit performs any combination of the following: setting a trigger source combination, setting a record data combination, setting a record data type combination, setting a trigger type combination, setting a resolution combination, and setting a logic combination. The event record unit is configured to store the record data combination in a storage unit in response to a logic combination result of the trigger source combination.

According to another embodiment of the present invention, an event recorder method is provided. The event recorder method includes: selecting an event combination; based on the selected event combination, performing a setting step to set a trigger source combination and a record data combination, wherein the setting step further comprises any combination of the following: setting a record data type combination, setting a trigger type combination, setting a resolution combination, and setting a logic combination; and in response to a logic combination result of the trigger source combination, storing the record data combination in a storage unit.

The above and other aspects of the invention will become better understood with regard to the following detailed description of the preferred but non-limiting embodiment(s). The following description is made with reference to the accompanying drawings.

DETAILED DESCRIPTION OF THE INVENTION

Technical terms are used in the specification with reference to the prior art used in the technology field. For any terms described or defined in the specification, the descriptions and definitions in the specification shall prevail. Each embodiment of the present disclosure has one or more technical features. Given that each embodiment is implementable, a person ordinarily skilled in the art can selectively implement or combine some or all of the technical features of any embodiment of the present disclosure.

Figure 1:
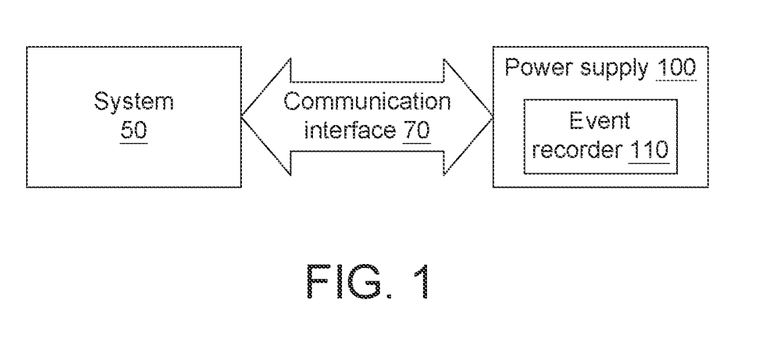
FIG. 1 is a schematic diagram of a power supply with an event recorder according to an embodiment of the present application.

FIG. 1 is a schematic diagram of a power supply with an event recorder according to an embodiment of the present application. As indicated in FIG. 1, the power supply 100 includes an event recorder 110 and other elements (not illustrated). The power supply 100 communicates with or is coupled to the system 50 through a communication interface 70. The system 50 includes but is not limited to a cloud server, a server, a storage device, a network device, and a power shelf. The power supply 100 includes but is not limited to an uninterruptible power supply (UPS), or a backup battery unit (BBU).

Figure 2:
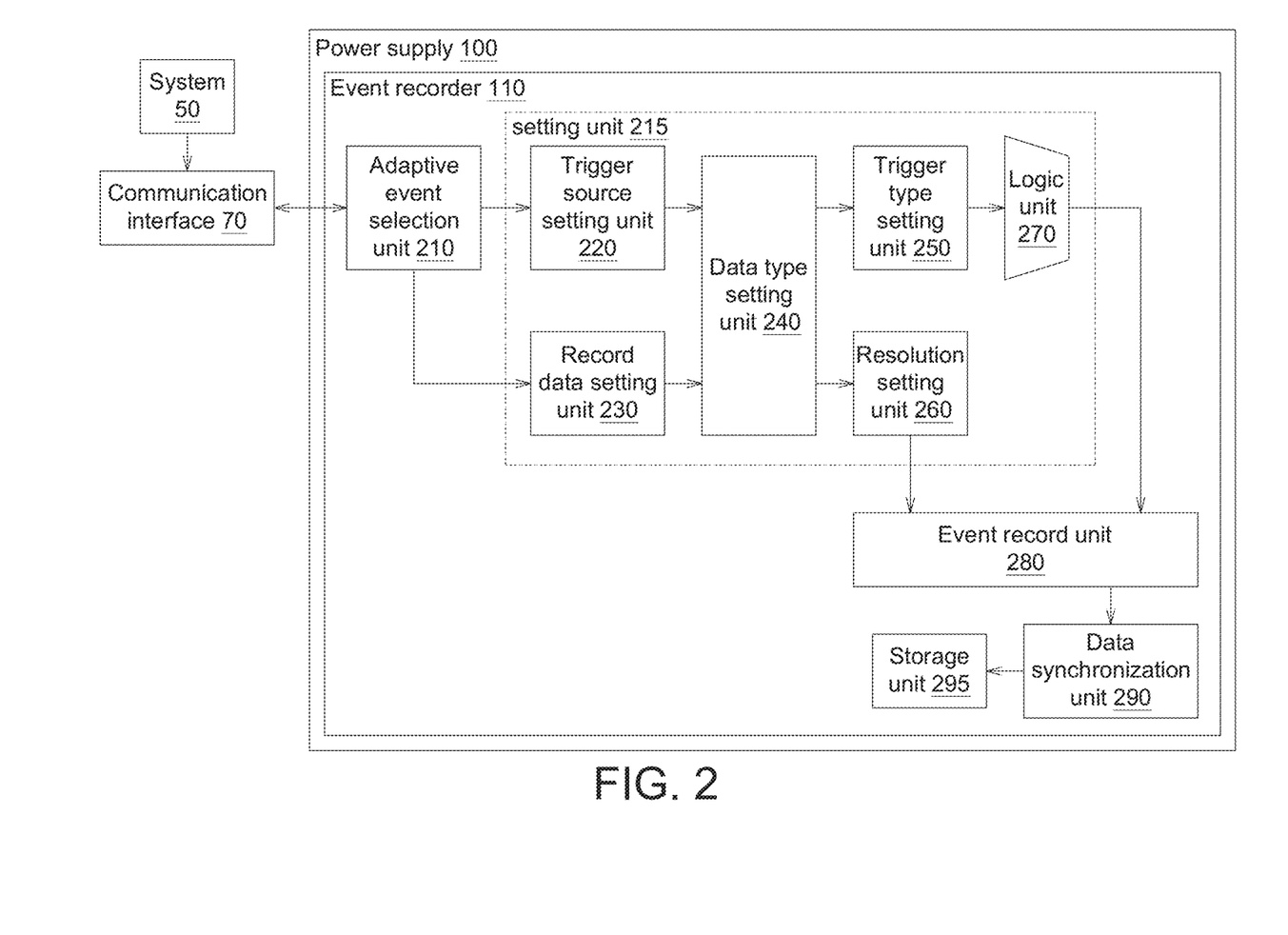
FIG. 2 is a functional block diagram of an event recorder according to an embodiment of the present application.

FIG. 2 is a functional block diagram of an event recorder according to an embodiment of the present application. The event recorder 110 includes an adaptive event selection unit 210, a trigger source setting unit 220, a record data setting unit 230, a data type setting unit 240, a trigger type setting unit 250, a resolution setting unit 260, a logic unit 270, an event record unit 280, a data synchronization unit 290 and a storage unit 295. In other possible examples of the present application, the storage unit 295 can be disposed outside the event recorder 110 and the said arrangement is still within the scope of the spirit of the present application. The storage unit 295 includes but is not limited to a hard disc.

In an embodiment of the present application, the trigger source setting unit 220, the record data setting unit 230, the data type setting unit 240, the trigger type setting unit 250, the resolution setting unit 260, the logic unit 270 together can be referred as a setting unit 215. In other possible embodiments of the present application, the setting unit 215 includes any combination of the trigger source setting unit 220, the record data setting unit 230, the data type setting unit 240, the trigger type setting unit 250, the resolution setting unit 260 and the logic unit 270, and the said arrangement is still within the scope of the spirit of the present application.

In an embodiment of the present application, the event recorder 110, the adaptive event selection unit 210, the trigger source setting unit 220, the record data setting unit 230, the data type setting unit 240, the trigger type setting unit 250, the resolution setting unit 260, the logic unit 270, the event record unit 280 and the data synchronization unit 290 can be realized by a circuit block, a firmware circuit, a circuit board having a plurality of electronic elements and wires, a storage medium storing a plurality of programming codes, or a corresponding software or a program in a chip, and the said arrangement is still within the scope of the spirit of the present application.

According to the user's selection, the adaptive event selection unit 210 can select different event combinations including but not limited to: a current share instability event, a communication error event, an input instability event or a combination thereof. Once the event combination is selected, the adaptive event selection unit 210 can suggest and set relevant data to better understand the cause of failure.

The trigger source setting unit 220 can set or adjust the trigger source combination according to the event combination selected by the user. The trigger source combination includes but is not limited to: the trigger source whose output voltage being higher the first rated voltage, such as 12.6V; the trigger source whose current share instability error being greater than 10% or a combination thereof. The trigger source setting unit 220 can achieve system snapshot according to the system requirements and system clock/time. When the power supply 100 is in a normal state, the adjustment of trigger source combination helps the user to better understand the events. The normal state of the power supply 100 includes but is not limited to: current share instability, communication error, and input instability. Moreover, the trigger source setting unit 220 also can support event trigger portfolio. Furthermore, the trigger source setting unit 220 also can support multiple trigger condition combination, such as edge trigger, and pulse trigger.

The record data setting unit 230 can set or adjust the record data combination according to the requirements or the selected event combination. The record data combination includes but is not limited to the record data such as input/output voltage, input/output current, communication interface, delay control, gate/source voltage of power transistor, internal flag and internal state or a combination thereof.

The data type setting unit 240 can set the record data type combination according to the selected event combination. The data type combination includes but is not limited to data type such as Boolean value (True, False), root-mean-square (RMS), peak-to-peak value, maximum/minimum value, mean value, duty cycle, frequency, instant value, or a combination thereof. The data type combination set by the data type setting unit 240 relates to the record data combination of the record data setting unit 230. For example, when the record data combination of the record data setting unit 230 is input/output voltage, the data type combination set by the data type setting unit 240 can be an instant value.

According to the selected event combination, the trigger type setting unit 250 can set or adjust (multiple) trigger type combination, including but not limited to the trigger type, such as edge trigger, sequence trigger, timeout trigger, pulse width trigger or a combination thereof.

According to the selected event combination, the resolution setting unit 260 can set or adjust resolution combination, including time resolution and/or data resolution. According to the error type, the resolution setting unit 260 can automatically set or adjust time resolution. Besides, the resolution setting unit 260 also can set multiple time resolutions to provide different perspectives of analysis.

According to the selected event combination, the logic unit 270 can perform logic combination on the trigger source combination to output a logic combination result. The logic combination includes but is not limited to logic and (AND), logic or (OR), and logic exclusive or (XOR).

In response to the output of the logic unit 270, the event record unit 280 can record data in the storage unit 295.

If the power supply 100 includes a plurality of internal chips for recording data, the data synchronization unit 290 makes the record data synchronized between other internal chips of the power supply 100 to provide better perspectives regarding the cause of failure. Moreover, the data synchronization unit 290 also aligns different time resolutions. The record data combinations of the event record unit 280 are synchronized and stored in the storage unit 295 by the data synchronization unit 290.

Figure 3A:
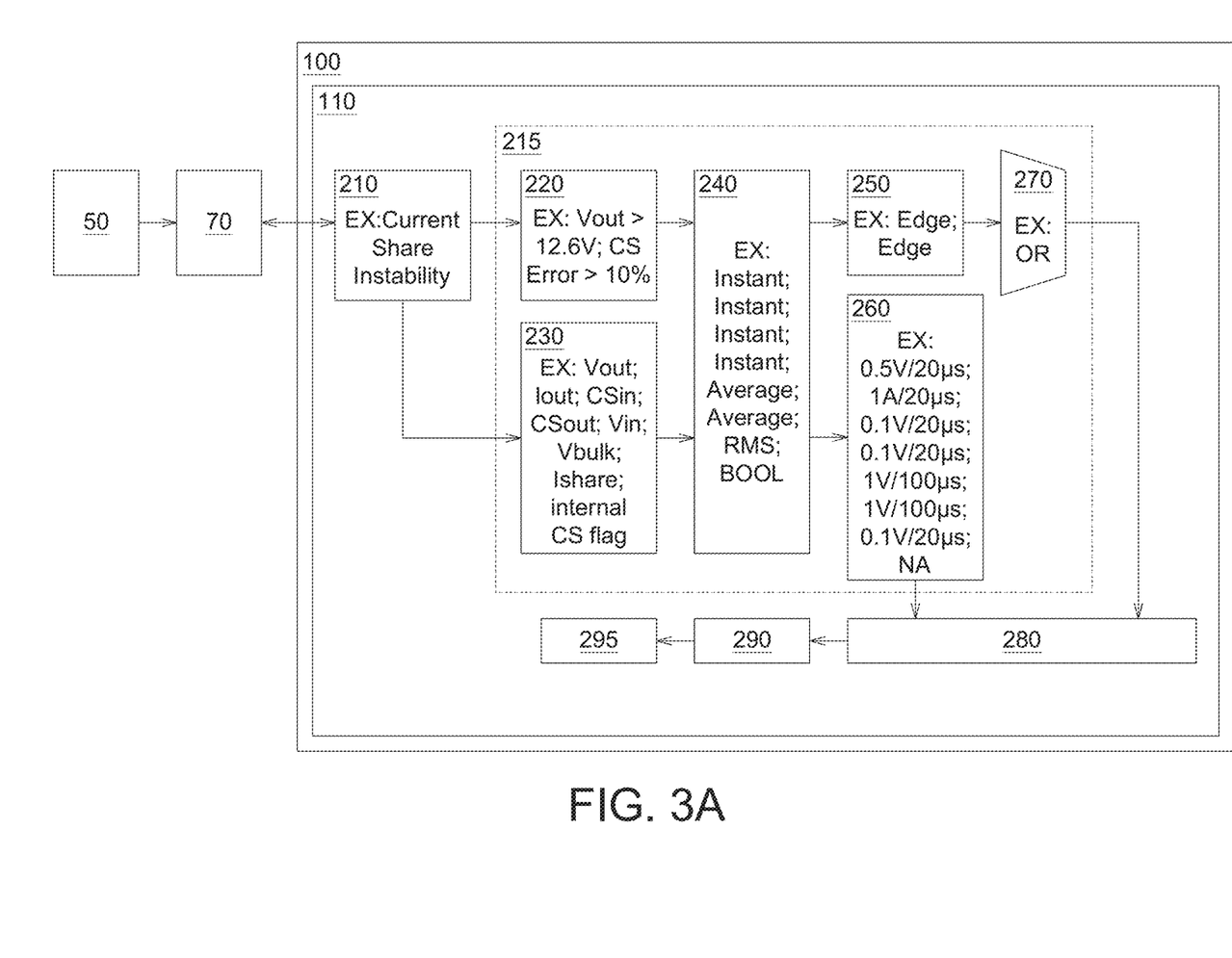
FIG. 3A to FIG. 3C are operation diagrams of the power supply according to an embodiment of the present application under different events.
Figure 3B:
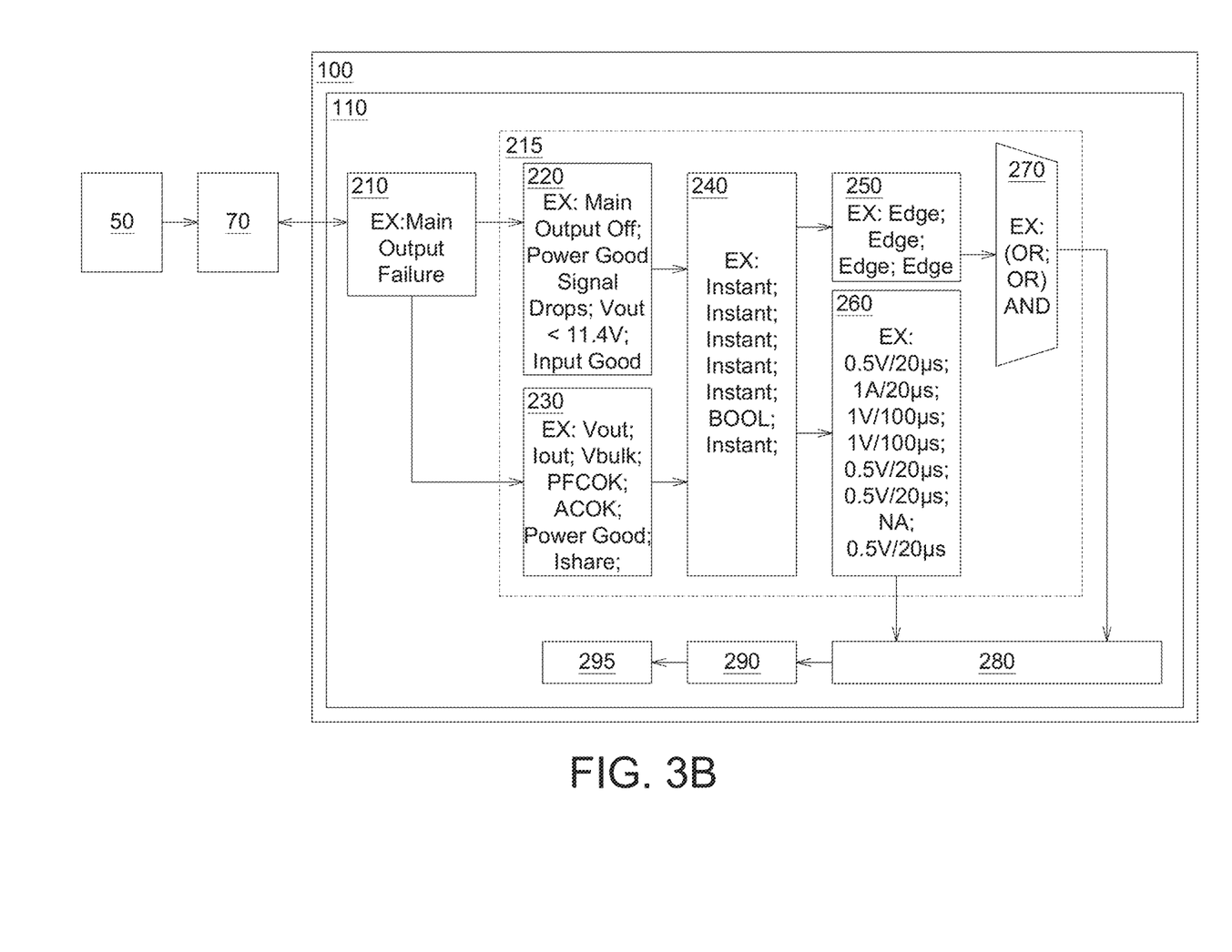
Figure 3C:
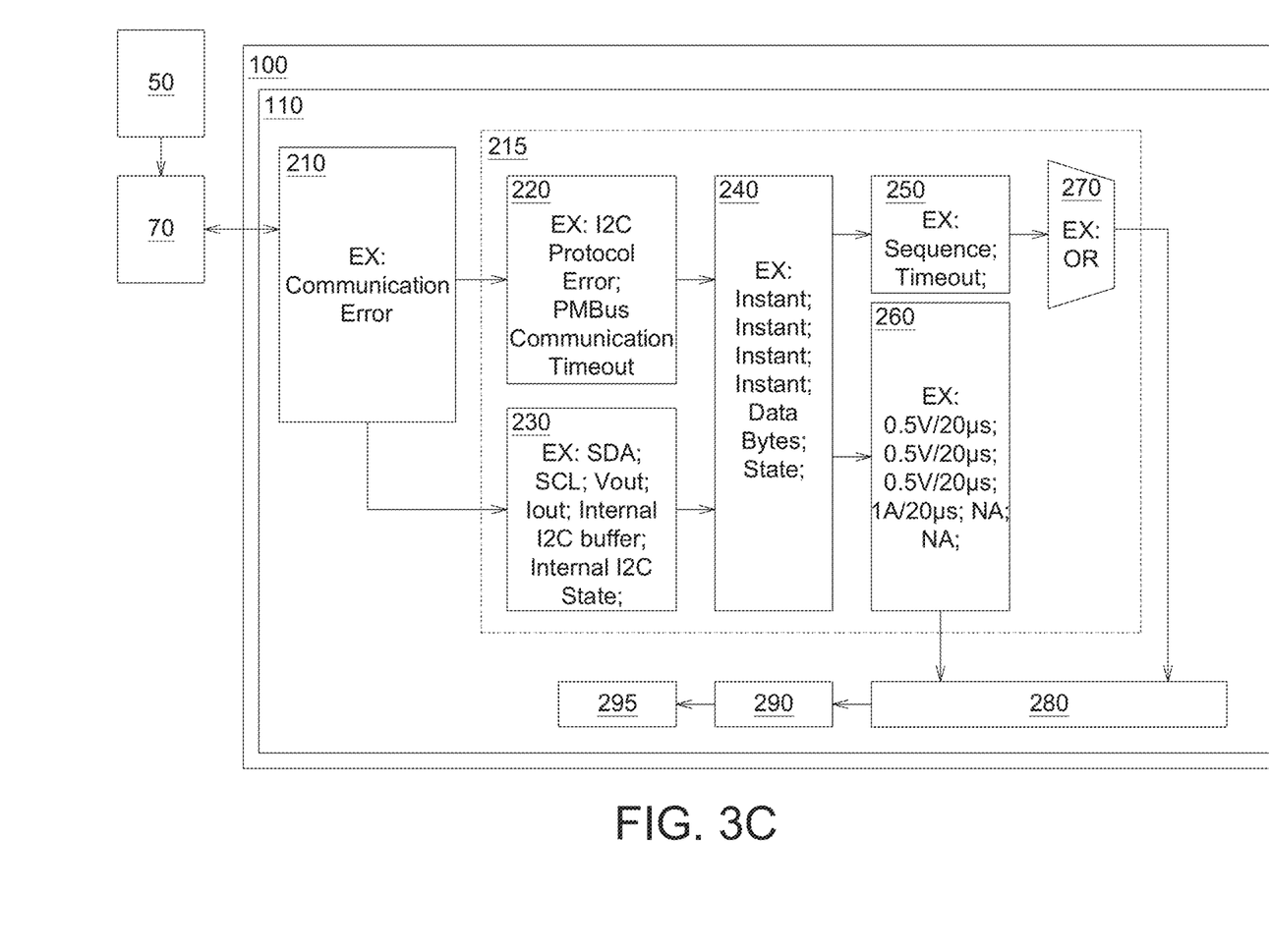

FIG. 3A to FIG. 3C are operation diagrams of the power supply according to an embodiment of the present application under different events. FIG. 3A is an operation diagram of a current share instability event. FIG. 3B is an operation diagram of a main output failure event. FIG. 3C is an operation diagram of communication error event.

As indicated in FIG. 3A, the user selects a current share instability event on the adaptive event selection unit 210. In response to the said selection, the trigger source setting unit 220 sets the trigger source combination to "the output voltage being greater than the first rated voltage, such as 12.6V (Vout>12.6V)" and "the current share error being greater than 10% (CS error>10%)". The record data combination set by the record data setting unit 230 includes: an output voltage (Vout), an output current (Iout), a current share command signal CSin, a current share feedback signal CSout, an input voltage (Vin), a bulk voltage (Vbulk), a current share (Ishare), and a current share flag (an internal CS flag). The data type combination set by the data type setting unit 240 includes: an instant value of the output voltage (Vout), an instant value of the output current (Iout), an instant value of the current share command signal CSin, an instant value of the current share feedback signal CSout, an average of the input voltage, an average of the bulk voltage, a root-mean-square (RMS) of the current share, and a Boolean value (BOOL) of the current share flag. The trigger type combination set by the trigger type setting unit 250 includes: edge trigger (that is, the trigger source will be triggered when the output voltage is greater than the first rated voltage, such as 12.6V) and edge trigger (that is, the trigger source will be triggered when the current share error is greater than 10%). The resolution combination set by the resolution setting unit 260 includes: resolution of the output voltage (Vout) being of 0.5V/20 µs, resolution of the output current being 1 A/20 µs, resolution of the current share command signal CSin being 0.1V/20 µs, resolution of the current share feedback signal CSout being 0.1V/20 µs, resolution of the input voltage being 1V/100 µs, resolution of the bulk voltage being 1V/100 µs, resolution of the current share being 0.1V/20 µs, and resolution of the current share flag being unavailable (NA); the logic combination of the logic unit 270 is logic or (OR).

That is, in FIG. 3A, when the output voltage is greater than 12.6V or the current share error is greater than 10%, the logic unit 270 will output a logic high signal to the event record unit 280, so that the record data combination (such as the output voltage, the output current, the current share command signal CSin, the current share feedback signal CSout, the input voltage, the bulk voltage, the shared current, and the current share flag) will be synchronized and recorded in the storage unit 295 by the data synchronization unit 290.

As indicated in FIG. 3B, the user selects a main output failure event on the adaptive event selection unit 210. In response to the said selection, the trigger source setting unit 220 sets the trigger source combination as "main output off", "power good signal drops", "output voltage less than the second rated voltage, such as 11.4V (Vout<11.4V)" and "input good". The record data setting unit 230 sets the record data combination as: the output voltage (Vout), the output current (Iout), the input voltage (Vin), the bulk voltage (Vbulk), the bulk voltage good signal PFCOK, the input voltage good signal ACOK, the power good signal (POWERGOOD), and the current share (Ishare). The data type combination set by the data type setting unit 240 includes: the instant value of the output voltage (Vout), the instant value of the output current (Iout), the instant value of the input voltage (Vin), the instant value of the bulk voltage (Vbulk), the instant value of the bulk voltage good signal PFCOK, the instant value of the input voltage good signal ACOK, the Boolean value (BOOL) of power good signal (POWERGOOD), and the instant value of the current share. The trigger type combination set by the trigger type setting unit 250 includes: edge trigger (that is, the trigger source will be triggered when the main output voltage is turned off), edge trigger (that is, the trigger source will be triggered when the power good signal drops), edge trigger (that is, the trigger source will be triggered when the output voltage is less than 11.4V), and edge trigger (that is, the trigger source will be triggered when the input good signal). The resolution combination set by the resolution setting unit 260 includes: a resolution of the output voltage (Vout) being 0.5V/20 µs, a resolution of the output current (Iout) being 1 A/20 µs, a resolution of the input voltage (Vin) being 1V/100 µs, a resolution of the bulk voltage (Vbulk) being 1V/100 µs, a resolution of the bulk voltage good signal PFCOK being 0.5V/20 µs, a resolution of the input voltage good signal ACOK being 0.5V/20 µs, a resolution of the power good signal (POWERGOOD) being unavailable (NA), and a resolution of the current share being 0.5V/20 µs. The logic combination of the logic unit 270 is logic or (OR), logic or (OR), logic and (AND) (that is, logic or is performed on every two of the 4 trigger sources, then logic and is performed on the same). When the logic unit 270 outputs a logic high signal to the event record unit 280, the record data combination (such as the output voltage (Vout), the output current (Iout), the input voltage (Vin), the bulk voltage (Vbulk), the bulk voltage good signal PFCOK, the input voltage good signal ACOK, the power good signal (POWERGOOD), and the current share (Ishare)) will be synchronized and recorded in the storage unit 295 by the data synchronization unit 290.

As indicated in FIG. 3C, the user selects a communication error event on the adaptive event selection unit 210. In response to the said selection, the trigger source setting unit 220 sets the trigger source combination as "I2C protocol error" and "PMbus communication timeout". The record data combination set by the record data setting unit 230 includes: the serial data line SDA, the serial clock line SCL, the output voltage (Vout), the output current (Iout), the internal I2C buffer, and the internal I2C state. The data type combination set by the data type setting unit 240 includes: the instant value of the serial data line SDA, the instant value of the serial clock line SCL, the instant value of the output voltage (Vout), the instant value of the output current (Iout), the data byte of the internal I2C buffer, and the state data of the internal I2C state. The trigger type combination set by the trigger type setting unit 250 includes: sequence (that is, the trigger source will be triggered when the serial data line SDA and the serial clock line SCL have protocol error), timeout (that is, the trigger source will be triggered when PMbus communication is timeout). The resolution combination set by the resolution setting unit 260 includes: a resolution of the serial data line SDA being 0.5V/20 µs, a resolution of the serial clock line SCL being 0.5V/20 µs, a resolution of the output voltage (Vout) being 0.5V/20 µs, a resolution of the output current (Iout) being 1 A/20 µs, a resolution of the internal I2C buffer being unavailable (NA), and a resolution of the internal I2C state being unavailable (NA). When the logic combination of the logic unit 270 is logic or (OR) (that is, when one of the I2C protocol error and the PMbus communication timeout is triggered, the logic unit 270 outputs a logic high signal). When the logic unit 270 outputs a logic high signal to the event record unit 280, the record data combination (such as the serial data line SDA, the serial clock line SCL, the output voltage (Vout), the output current (Iout), the internal I2C buffer and the internal I2C state) will be synchronized and recorded in the storage unit 295 by the data synchronization unit 290.

Figure 4A:
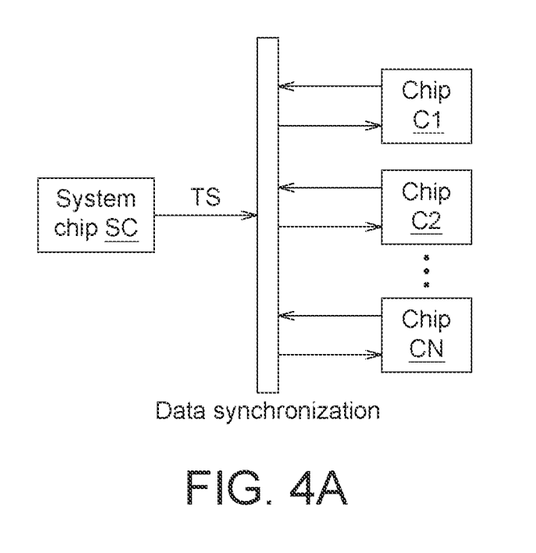
FIG. 4A and FIG. 4B are operation diagrams of data synchronization between different chips in the power supply according to an embodiment of the present application.
Figure 4B:
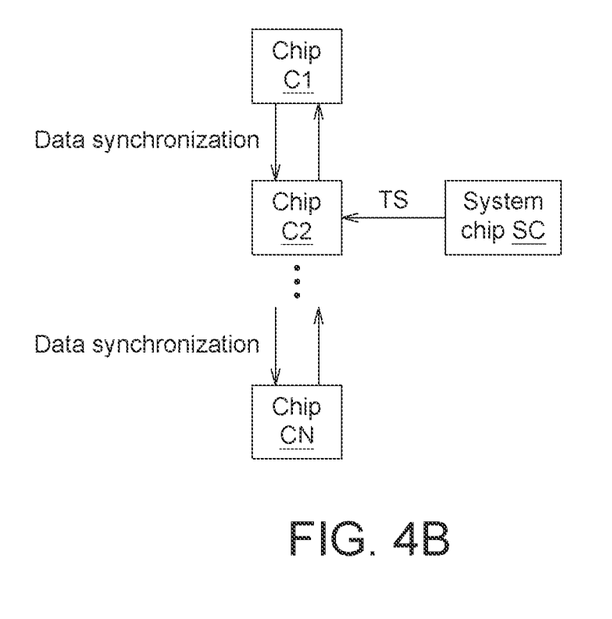

FIG. 4A and FIG. 4B are schematic diagrams of data synchronization between different chips in the power supply according to an embodiment of the present application. As indicated in FIG. 4A. The system chip SC transmits a trigger signal TS to a plurality of chips C1~CN to achieve data synchronization between the chips C1~CN. As indicated in FIG. 4B, a system chip SC of the power supply transmits a trigger signal TS to a target chip of the chips C1~CN to achieve data synchronization between the chip C1~CN, wherein, the target chip refers to the chip receiving the trigger signal TS. In the example of FIG. 4B, the chip C2 is the target chip. Whether data is synchronized through the configuration of FIG. 4A or FIG. 4B depends on the communication interface in use.

Details of data synchronization according to an embodiment of the present application are disclosed below.

When data is synchronized, if the system 50 needs to be aligned with the power supply 100 in terms of time, the system 50 can transmit a system time and a system date to the power supply 100.

Moreover, data synchronization or time alignment between different chips in the power supply 100 can be achieved through general purpose input output (GPIO) pins or a time stamp. The time stamp can be transmitted to the chips through the system clock of the system 50. Also, to achieve time synchronization, data transmission time can be estimated according to the calculated transmission time of communication protocol.

In an embodiment of the present application, the synchronization between a plurality of internal buffers of a plurality of chips includes but is not limited to pointer mapping synchronization.

Figure 4C:
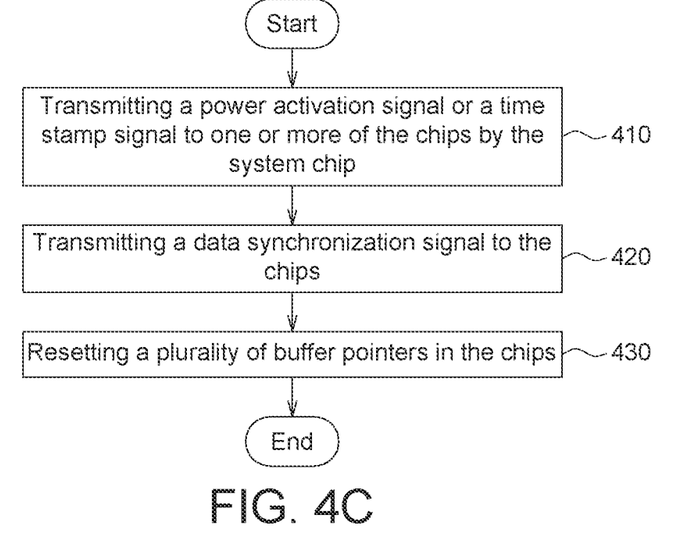
FIG. 4C is a flowchart of synchronization between different chips in the power supply internal buffers according to an embodiment of the present application.

FIG. 4C is a flowchart of synchronization between different chips in the power supply internal buffers according to an embodiment of the present application. In step 410, a power activation signal or a time stamp signal to one or more of the chips C1~CN is transmitted by the system chip (such as the system chip SC of FIG. 4A and FIG. 4B). In step 420, a data synchronization signal is transmitted to the chips as indicated in FIG. 4A or FIG. 4B. In step 430, a plurality of buffer pointers in the chips are reset. Buffer synchronization between the chips can be achieved according to FIG. 4C.

Figure 4D:
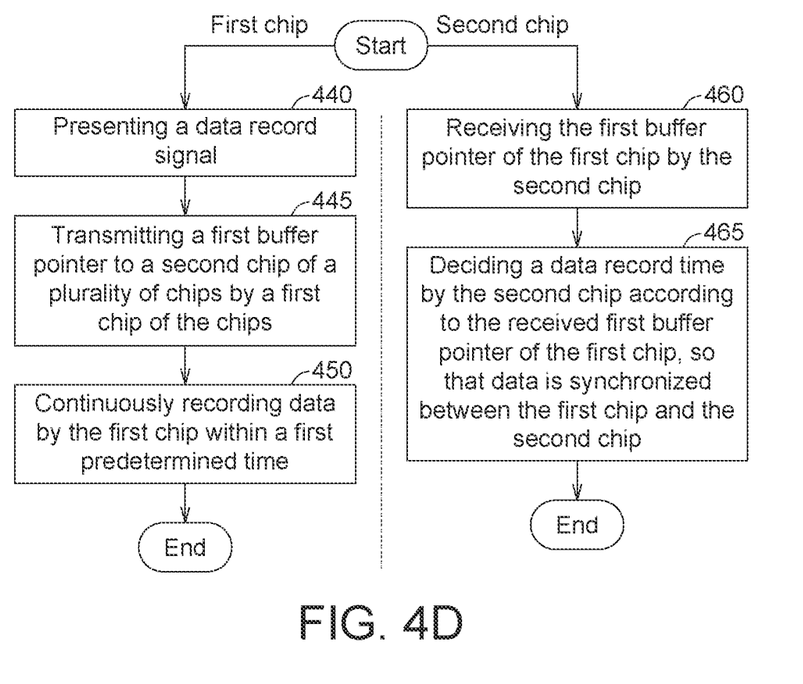
FIG. 4D is a flowchart of data synchronization between different chips according to an embodiment of the present application.

FIG. 4D is a flowchart of data synchronization between different chips according to an embodiment of the present application. In step 440, a data record signal is presented when the logic unit 270 outputs a logic high signal to the event record unit 280, such as the system fails or is triggered. In step 445, a first buffer pointer is transmitted to a second chip of a plurality of chips (including but not limited to chip C2) by a first chip of the chips (including but not limited to chip C1). In step 450, data is continuously recorded by the first chip within a first predetermined time (such as 100 ns).

In step 460, the first buffer pointer of the first chip is received by the second chip. In step 465, a data record time is decided by the second chip according to the received first buffer pointer of the first chip, so that data can be synchronized between the first chip and the second chip. FIG. 4D is exemplified by data synchronization between the first chip and the second chip (such as chip C1 and C2), wherein data synchronization can also be achieved between other chips.

Figure 5:
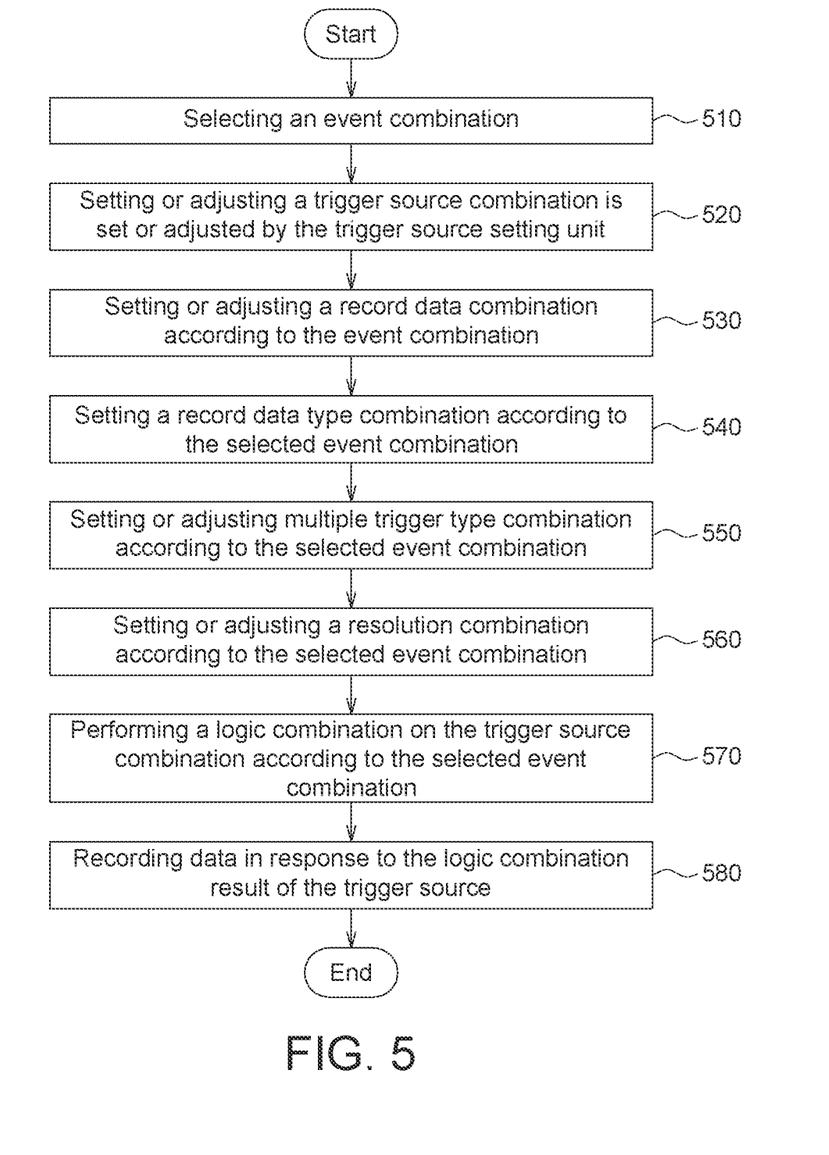
FIG. 5 is a flowchart of an event recording method according to an embodiment of the present application.

FIG. 5 is a flowchart of an event recording method according to an embodiment of the present application. In step 510, an event combination is selected by the user through the adaptive event selection unit 210. In step 520, a trigger source combination is set or adjusted by the trigger source setting unit 220 according to the event combination selected by the user. In step 530, a record data combination is set or adjusted by the record data setting unit 230 according to the event combination. In step 540, a record data type combination is set by the data type setting unit 240 according to the selected event combination. In step 550, multiple trigger type combination is set or adjusted by the trigger type setting unit 250 according to the selected event combination. In step 560, a resolution combination (such as time resolution and/or data resolution) is set or adjusted by the resolution setting unit 260 according to the selected event combination. In step 570, a logic combination is performed on the trigger source combination by the logic unit 270 according to the selected event combination. In step 580, data is recorded in the storage unit 295 by the event record unit 280 in response to the output of the logic unit 270 (that is, in response to the logic combination result of the trigger source). In other possible embodiments of the present application, steps 520-570 together can be referred as a setting step including any combinations of steps 520-570.

In other possible embodiments of the present application, the performing sequence of steps 520-570 is not limited to the sequence exemplified in FIG. 5. That is, the sequence of steps 520-570 can be varied; or, the steps 520-570 can be performed concurrently, and the said arrangements are still within the scope of the spirit of the present application.

Figure 6:
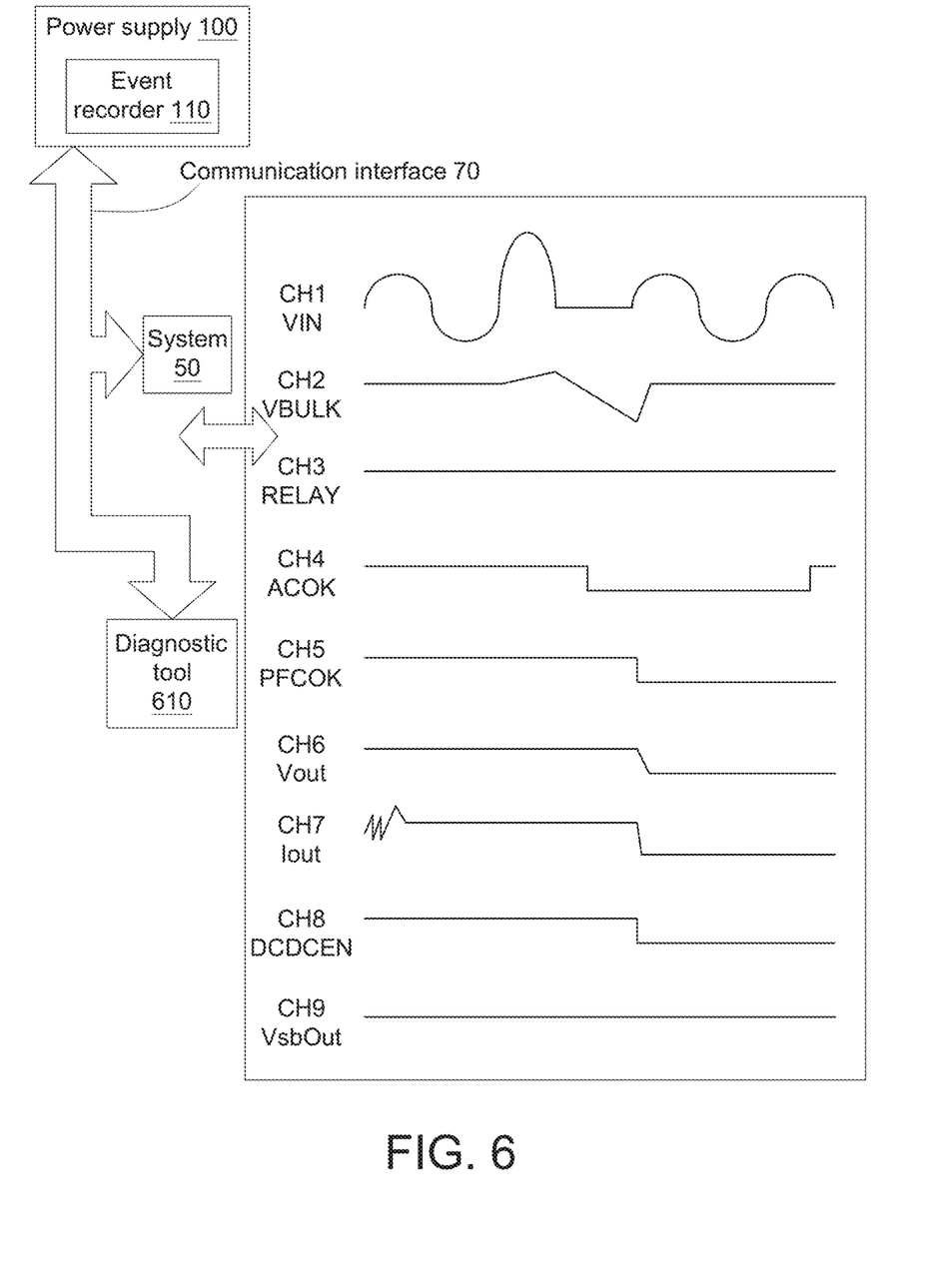
FIG. 6 is a utilization state of the power supply according to an embodiment of the present application.

FIG. 6 is a utilization state of the power supply according to an embodiment of the present application. As indicated in FIG. 6, channels CH1~CH5 are such as the data recorded by a first chip (such as chip C1), and channels CH6~CH9 such as the data recorded by a second chip (such as chip C2). Through the above embodiment, the chips can achieve data synchronization, so that the channel CH1~CH9 can be aligned in terms of the time. The data or content recorded by the event recorder 110 can be transmitted to the diagnostic tool 610 and the system 50 through the communication interface 70. The diagnostic tool 610 is an independent device configured to simulate the communication protocol of the system 50. That is, the event recorder 110 of the power supply 100 can be accessed through the system 50 or the diagnostic tool 610, so that the analysis personnel can understand the cause of failure or abnormalities more conveniently. Therefore, the event recorder 110 according to the embodiment of the present application enables the failure of electronic elements, such as power supply, to be more conveniently detected so that the cause of failure can be better understood.

In an embodiment of the present application, the user (such as the user or operator of the system 50) can edit the adaptive event selection unit 210 through the communication interface 70, so that the event combination can be augmented or corrected.

In an embodiment of the present application, the set items (such as trigger source combination, record data combination, record data type combination, trigger type combination, resolution combination, and logic combination) can be stored in the storage unit 295.

To summarize, the event recorder according to an embodiment of the present application can improve the traceability, sustainability, reliability of the power supply and system products.

In an embodiment of the present application, when the power supply shuts down or breaks down accidentally, the cause of failure can be better understood through the event recorder.

In an embodiment of the present application, since data can be synchronized between different chips, the performance of the power supply can be enhanced.

In an embodiment of the present application, since the trigger source can be set or adjusted, the system can be better used in different applications.

In an embodiment of the present application, since the record data and the resolution both can be set or adjusted, the failure conditions can be better understood.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An event recorder for a power supply, comprising:
an adaptive event selection unit configured to select a power supply event combination;
a setting unit configured to perform a setting step based on the power supply event combination, set a power supply trigger source combination and a power supply record data combination, and perform any combination of the following: setting a record data type combination, setting a trigger type combination, setting a resolution combination, and setting a logic combination; and a power supply event record unit configured to store the power supply record data combination in a storage unit in response to a logic combination result of the power supply trigger source combination, wherein the power supply event combination is a main output failure event.

2. The event recorder according to claim 1, further comprising:

a data synchronization unit configured to synchronize and record the power supply record data combination of the power supply event record unit in the storage unit.

3. The event recorder according to claim 2, wherein, the adaptive event selection unit, the setting unit, the power supply event record unit, and the data synchronization unit are realized by a circuit block, a firmware circuit, a circuit board having a plurality of electronic elements and wires, a storage medium storing a plurality of programming codes, a corresponding software, or a program in a chip.

4. The event recorder according to claim 1, wherein, the setting unit comprises any combination of the following: a trigger source setting unit, a record data setting unit, a data type setting unit, a trigger type setting unit, a resolution setting unit, and a logic unit.

5. The event recorder according to claim 2, wherein, when the data synchronization unit synchronizes a plurality of internal buffers of a plurality of chips:

a power activation signal or a time stamp signal is transmitted to one or more of the chips by a system chip;

a data synchronization signal is transmitted to the chips; and a plurality of buffer pointers in the chips are reset.

6. The event recorder according to claim 2, wherein, when the data synchronization unit synchronizes data:

a data record signal appears;

a first buffer pointer is transmitted to a second chip of a plurality of chips by a first chip of the chips;

the first chip continuously records data within a first predetermined time;

the second chip receives the first buffer pointer of the first chip; and the second chip decides a data record time according to the received first buffer pointer, so that data is synchronized between the second chip and the first chip.

7. The event recorder according to claim 1, further comprising:

a communication interface coupled to the event recorder to edit, augment, or correct the power supply event combination on the adaptive event selection unit.

8. The event recorder according to claim 1, wherein, the power supply trigger source combination, the power supply record data combination, the record data type combination, the trigger type combination, the resolution combination, and the logic combination are stored in the storage unit.

9. An event recorder method, comprising:

selecting a power supply event combination;

performing a setting step to set a power supply trigger source combination and a power supply record data combination based on the power supply event combination, wherein the setting step further comprises any combination of the following: setting a record data type combination, setting a trigger type combination, setting a resolution combination, and setting a logic combination; and storing the power supply record data combination in a storage unit in response to a logic combination result of the power supply trigger source combination, wherein the power supply event combination is a main output failure event.

10. The event recorder method according to claim 9, further comprising: synchronizing and recording the power supply record data combination in the storage unit.

11. The event recorder method according to claim 10, wherein, when data is synchronized in a plurality of internal buffers of a plurality of chips, a power activation signal or a time stamp signal is transmitted to one or more of the chips from a system chip;

a data synchronization signal is transmitted to the chips; and a plurality of buffer pointers in the chips are reset.

12. The event recorder method according to claim 10, wherein, when data is synchronized, a data record signal appears;

a first buffer pointer is transmitted to a second chip of the chips by a first chip of a plurality of chips;

the first chip continuously records data within a first predetermined time;

the second chip receives the first buffer pointer of the first chip; and the second chip decides a data record time according to the received first buffer pointer, so that data is synchronized between the second chip and the first chip.

13. The event recorder method according to claim 9, further comprising:

augmenting or editing the power supply event combination through a communication interface.

* * * * *